Figure 1:
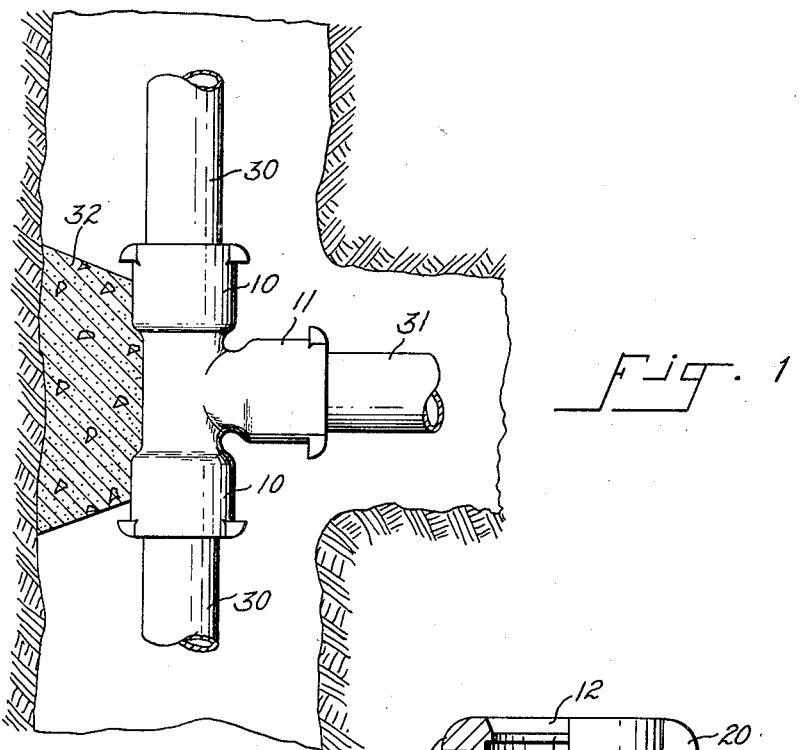

May 1, 1951 R. W. PINGER 2,551,393
PIPE FITTING
Filed March 22, 1949

INVENTOR.
Roland W. Pinger
BY Buckhorn and Cheatham
Attorneys

Patented May 1, 1951

2,551,393

UNITED STATES PATENT OFFICE 2,551,393

PIPE FITTING

Roland W. Pinger, Portland, Oreg.

Application March 22, 1949, Serial No. 82,772

5 Claims. (Cl. 285—210)

The present invention comprises an improvement in pipe fittings particularly designed for the purpose of connecting branches to pipes formed of relatively fragile material such as composition pipes of the type commercially distributed under the trade-mark "Transite." The invention, however, is not to be limited to pipes of this particular composition, as it may be of utility in connection with refractory, cast metal or other types of pipes, provided that the external surfaces of the pipe ends are held to close tolerances so that they may be sealed to the fitting by the use of resilient gaskets such as disclosed in the patent to Mazza, 1,947,998 dated February 20, 1934. The invention may be utilized in connection with steel pipe and centrifugally cast iron pipe, but the advantages of the invention are such as to make it of primary use in connection with pipes made of relatively fragile material.

In utilizing fragile pipes of the class described, it is imperative that special allowance be made for the settling of heavy T's and other fittings, and the recommended procedure is as follows. At the point where a branch is to be united with the main line a T is connected to the standard pipe lengths through interposed short lengths of pipe in the range of two to four feet long. This is done in order that the heavy fittings ordinarily employed may settle over the course of years, the settling being accompanied by tilting of the short connecting lengths of pipe which prevents the imposition of heavy strains upon the standard lengths of pipe leading up to the fitting. If it were not for the interposition of these short lengths the standard lengths of pipe, which are normally ten to twenty feet long, would be held against movement throughout the greater portion of their lengths but forced downwardly at their ends adjacent a fitting, with resultant failure of the conduit.

The usual method of joining the ends of pipe lengths, or of sealing a pipe end into a fitting when employing pipe of the character described, is to move a sealing gasket into a coupling ring surrounding the pipe, or into the end bell of the fitting, as the pipe end is being inserted. Details of such a connection are fully disclosed in the Mazza patent. In order that high pressures may be maintained within a conduit so coupled together, the external diameter of the pipe end must be held to very close tolerances and, similarly, the interiors of the couplings and of the end bells of fittings must be held to very close tolerances. Since the couplings are supplied by the manufacturers of the pipe, the tolerances of the couplings may be maintained. This is usually accomplished by machining the interior surface of the coupling after it has been cast or otherwise fabricated. Likewise, each end of each pipe is usually machined to close tolerances for a short distance from the end of the pipe. In order that short lengths of pipe may be provided for interposition between standard lengths and a heavy fitting, it is common practice to supply a standard length of pipe which has been machined to close tolerances throughout its length, this length of pipe being cut in the field to provide the shorter lengths desired. It is a primary purpose of the present invention to eliminate the extra expense involved, first in machining a standard length throughout its length and, secondly, in cutting it into short lengths in the field, since the fitting of the present invention may be connected directly to standard lengths of pipe.

It is also the present practice in using such pipes when combined with standard cast-iron fittings of the ordinary type, to caulk the ends of the short intermediate pipes into the fitting by the use of the usual oakum and lead which is poured and caulked into place. This is necessary since standard cast-iron fittings cannot be held to the close internal tolerances required for holding high pressures by the means of resilient sealing rings of the type employed at the couplings. A purpose of the present invention is to eliminate the necessity for caulking the ends of such pipes into the fitting, such elimination of caulked joints resulting not only in a saving in time of specialist labor but in the cost of equipment and materials required to lay a conduit.

A further object of the present invention is to eliminate the danger of conduit failures due to settling, earth movements and traffic vibration, in spite of the insertion of short lengths of pipe between the standard lengths and a fitting such as a T. When such short lengths of pipe are connected to an ordinary cast-iron T the joints between the pipes and the fitting must be practically rigid in order to be effective, the rigidity being achieved by pouring lead into the joint and then driving it firmly into position by the use of a caulking tool and hammer, but there is great danger that even the short, interposed lengths of pipe will fail upon settling of the main conduit. This is particularly true where a branch may be more firmly anchored than the main line. For example, a short branch leading to a fire hydrant may be anchored on concrete footings, or the branch trench may not have been excavated to the same depth as the main trench was excavated and the softer backfill under the main trench would permit the main line to settle farther than the branch. If this occurs the arms of the T tend to rotate about their axes and the leg of the T tends to swing about the axes of the arms, with the result that a portion of the main line or of the branch might be fractured. In using the present invention this cannot happen even though the main line should settle more than the branch line, since each pipe is permitted up to 5° deflection with safety.

A further object of the present invention is to provide a fitting of the character described which may be easily handled by the ordinary workman and which may be easily and quickly attached to the pipes by the use of the standard pulling equipment employed for forcing the couplings into place at the joints between standard pipe lengths.

The objects and advantages of the present invention will be more readily understood by inspection of the following specification taken in connection with the accompanying drawing wherein like numerals refer to like parts throughout, while the features of novelty will be more distinctly pointed out in the appended claims.

Figure 2:
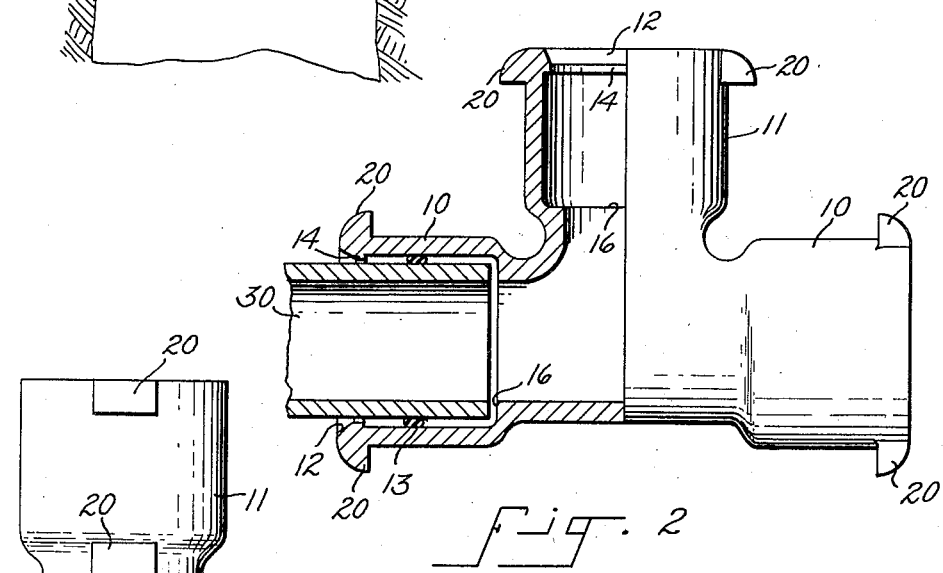
Figure 3:
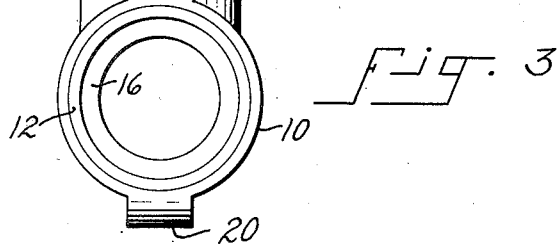

In the drawing, Fig. 1 is a plan view of a T fitting made in accordance with the present invention combined with pipes in a typical installation;

Fig. 2 is a plan view, partially broken away, of a fitting made in accordance with the present invention and illustrating a pipe end sealed therein by the use of a resilient ring gasket; and Fig. 3 is an end view of the fitting illustrated in Fig. 2.

A fitting formed in accordance with my invention comprises a plurality of integrally connected, cylindrical end bells whose axes lie in a common plane and intersect at a common point. The fitting particularly illustrated herein is a T adapted to join a branch to a main line, with the diameter of the branch being equal to that of the main line, but it is to be appreciated that other fittings may be made in accordance with my invention. The T in this case comprises a pair of end bells 10 forming the arms of the T and an end bell 11 forming the leg of the T and whose axis lies in the same plane as the axes of the end bells 10, all of the axes intersecting at a common point. The fitting is cast, with the interiors of the end bells being cast to close tolerances or machined to tolerances after casting. Each end bell terminates in a funnel-shaped mouth 12 for facilitating the entry of the sealing ring 13, and each end bell comprises an internal flange 14 at the inner end of the funnel mouth 12 or equivalent means to prevent excess pressure surges from blowing the gasket out of the end bell. Each end bell is of the same depth and each terminates in a shoulder 16 defining a central portion whose internal diameter is equal to the internal diameter of the connected pipes. In a T of the character disclosed the end bells will be equal in depth and the distances from the point of intersection of the axes to the inner extremities of the end bells will be equal in length, with the distances from the intersection to the inner extremities of the end bells being less than the depth of the end bell, except in those cases where the pipe is relatively large. A table of the preferred dimensions of smaller fittings is as follows:

| Internal Diameter of Pipe in Inches | 3 | 4 | 6 | 8 |
|---|---|---|---|---|
| External Diameter of End Bells | 5 5/16 | 6 3/8 | 8 1/2 | 11 |
| Thickness of Fitting Walls | 1/2 | 1/2 | 1/2 | 5/8 |
| Depth of End Bells | 5 | 5 | 5 | 5 |
| Distance from Intersection of Axes to Inner Extremities of End Bell | 3 1/2 | 4 | 5 | 6 |

Each end bell is preferably provided with a pair of lugs 20 on its external surface adjacent the open end of the end bell, the lugs preferably being diametrically disposed and all such lugs preferably lying in the common plane of the axes of the end bells so that when the fitting is laid in a trench they will be accessible for attaching a device for pulling the end of the pipe into the end bell.

In Fig. 1 a fitting of the character described is shown as being attached to pipes 30 providing a portion of a main line and a pipe 31 providing a portion of a branch line. The preferred practice in such installations includes abutting the fitting against a concrete back-stay 32 to prevent pressures developed in the branch pipe from moving the main line sideways. It is to be appreciated that the pipes 30 and 31 represent the extremities of standard lengths of pipe rather than short lengths of the type provided in accordance with past practice.

According to standard practice, the couplings and sealing rings are moved into place as follows. A coupling is first slipped onto one pipe and then a resilient sealing ring or gasket is drawn onto the same pipe to a certain distance according to manufacturer's specifications. A second sealing ring is then drawn onto the same pipe and located adjacent the end of the pipe. The pipe end is then aligned with the previously connected pipes forming the conduit and a coupling puller is disposed in operating position. Such coupling pullers include means to anchor one end to the previously laid pipe, means to hook over the coupling, and a mechanical or hydraulic jack or equivalent device which pulls the coupling toward the anchored end of the puller until the coupling is centered over the crack between the pipe ends. The coupling compresses the resilient sealing rings and moves them into proper position between the end of each pipe and the ends of the coupling. After the positions of the sealing rings are checked to see that they are in the proper place the free end of the newly joined pipe is raised and swung from side to side a specified distance so as to separate the ends of the pipe an amount permitting the required or permissible degree of bending at the joint. In utilizing fittings made in accordance with the present invention the same coupling puller may be employed and practically the same procedure followed. The procedure is different in that only one sealing ring is positioned on the pipe, preferably about one-fourth inch from the end of the pipe. The pipe end is then moved into alignment with the end bell. One end of the puller is then anchored to the pipe in the susual manner and the other end may be slipped behind the lugs 20 in the same manner that it is slipped behind the coupling when making joints. Operation of the jack then results in movement of the pipe end into the stationary fitting or movement of the fitting onto the stationary pipe end, as the case may be. After checking to see that the sealing ring is properly positioned, the pipe or the fitting may be lifted and swung from side to side to separate the pipe from the shoulder 16, as illustrated in Fig. 2, so that the desired degree of flexibility may be achieved.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. A pipe fitting particularly adapted for the purpose described comprising a plurality of integrally connected, cylindrical end bells whose axes lie in a common plane and intersect at a common point, said end bells being of the type in which pipe ends may be sealed by resilient gaskets of the type adapted to be moved into sealing position upon the insertion of the pipe ends, and each of said end bells having a pair of diametrically disposed lugs protruding from its external surface adjacent the open end of the end bell with all of said lugs lying in the plane of the end bell axes.

2. A pipe T particularly adapted for the purpose described comprising a plurality of integrally connected end bells including a pair of end bells arranged along a common axis and defining the arms of the T and an end bell arranged along an axis defining the leg of the T and into each of which a pipe end may be inserted, said end bells being of the type in which pipe ends may be sealed by resilient gaskets of the type adapted to be moved into sealing position upon the insertion of the pipe ends, said end bells being equal in length and the distances from the inner extremity of each end bell to the intersection of the axis of the leg with the axis of the arms of the T being equal, and the depth of each end bell being greater than the distance from said intersection to the inner extremity of each end bell.

3. A pipe T particularly adapted for the purpose described comprising a plurality of integrally connected end bells including a pair of end bells arranged along a common axis and defining the arms of the T and an end bell arranged along an axis defining the leg of the T and into each of which a pipe end may be inserted, said end bells being of the type in which pipe ends may be sealed by resilient gaskets of the type adapted to be moved into sealing position upon the insertion of the pipe ends, said end bells being equal in length and the distances from the inner extremity of each end bell to the intersection of the axis of the leg with the axis of the arms of the T being equal, the depth of each end bell being greater than the distance from said intersection to the inner extremity of each end bell, and each of said end bells having a pair of diametrically disposed lugs protruding from its external surface adjacent the open end of the end bell, with all such lugs lying in a common plane.

4. A pipe fitting particularly adapted for the purpose described comprising a plurality of integrally connected, cylindrical end bells whose axes lie in a common plane and intersect at a common point, said end bells being of the type in which pipe ends may be sealed by resilient gaskets of the type adapted to be moved into sealing position upon the insertion of the pipe ends, said end bells being equal in length and the distances from the inner extremity of each end bell to the intersection of the axes thereof being equal, the depth of each end bell being greater than the distance from the point of intersection of the end bell axes to the inner extremity of each end bell, and each of said end bells having a pair of diametrically disposed lugs protruding from its external surface adjacent the open end of the end bell, with all such lugs lying in the plane of the end bell axes.

5. A pipe fitting particularly adapted for the purpose described comprising a plurality of intergrally connected, cylindrical end bells whose axes lie in a common plane and intersect at a common point, said end bells being of the type in which pipe ends may be sealed by resilient gaskets of the type adapted to be moved into sealing position upon the insertion of the pipe ends, said end bells being equal in length and the distance from the inner extremity of each end bell to the intersection of the axes thereof being equal, and the depth of each end bell being approximately equal to the distance from said intersection to the inner extremity of each end bell.

ROLAND W. PINGER.

REFERENCES CITED

The following references are of record in the file of this patent:

UNITED STATES PATENTS

| Number | Name | Date |
| --- | --- | --- |
| 520,988 | Harrington | June 5, 1894 |
| 835,504 | Edwards et al. | Nov. 13, 1906 |
| 1,059,438 | Clark | Apr. 22, 1913 |
| 2,272,115 | Halkyard | Feb. 3, 1942 |